US009699728B2

(12) United States Patent
Eskelinen

(10) Patent No.: US 9,699,728 B2
(45) Date of Patent: Jul. 4, 2017

(54) METHOD AND APPARATUS FOR POWER SAVING

(71) Applicant: MEDIATEK SINGAPORE PTE. LTD., Singapore (SG)

(72) Inventor: Jarkko Eskelinen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/277,634

(22) Filed: Sep. 27, 2016

(65) Prior Publication Data

US 2017/0094599 A1    Mar. 30, 2017

(51) Int. Cl.
*H04W 52/02* (2009.01)
*H04W 60/04* (2009.01)
*H04W 60/02* (2009.01)

(52) U.S. Cl.
CPC ... *H04W 52/0212* (2013.01); *H04W 52/0235* (2013.01); *H04W 60/02* (2013.01); *H04W 60/04* (2013.01)

(58) Field of Classification Search
CPC .............. H04W 52/02; H04W 52/0212; H04W 52/0216; H04W 52/0235; H04W 52/0241; H04W 60/02; H04W 60/04; H04W 68/02; H04W 72/0406; H04W 76/048; H04W 72/0473; H04L 43/50; H04L 67/34; Y02B 60/50
See application file for complete search history.

(56) References Cited

U.S. PATENT DOCUMENTS

| 2013/0039244 | A1* | 2/2013 | Sun | H04W 52/0235 370/311 |
| 2014/0334366 | A1* | 11/2014 | Hsu | H04W 52/0225 370/311 |
| 2016/0073338 | A1* | 3/2016 | Kim | H04W 52/02 370/311 |
| 2016/0381639 | A1* | 12/2016 | Kim | H04W 52/0235 370/311 |
| 2017/0041873 | A1* | 2/2017 | Wu | H04W 52/0219 370/311 |

* cited by examiner

*Primary Examiner* — Thanh Le
(74) *Attorney, Agent, or Firm* — Oblon, McClelland, Maier & Neustadt, L.L.P.

(57) ABSTRACT

Aspects of the disclosure provide a method for power reduction in an electronic device. The method includes determining a local timer value corresponding to an idle time for the electronic device to stay in an idle mode. The electronic device is registered to a service provider to provide service to the electronic device. Further, the method includes starting, upon entering the idle mode, a specific timer with the local timer value, and another timer to track a next update time for the electronic device to update tracking area to the service provider for maintaining the electronic device to be registered to the service provider, exiting the idle mode and entering the power saving mode when the specific timer expires, exiting the power saving mode when the other timer expires, and updating the tracking area to the service provider to keep the electronic device being registered to the service provider.

20 Claims, 2 Drawing Sheets

METHOD AND APPARATUS FOR POWER SAVING

INCORPORATION BY REFERENCE

This present disclosure claims the benefit of U.S. Provisional Application No. 62/234,863, "Device local Power Saving Mode Activation in case network does lack support for Power saving mode" filed on Sep. 30, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power consumption is one of the dominant concerns for an electronic device that is a battery-powered. For example, machine type communication devices, such as wireless sensors, and the like are used to keep track of real-time information, such as temperature, rainfall, and the like. In an example, the machine type communication devices are battery powered, and can seldom-or never be recharged, thus power consumption is crucial to extend the battery life and the device life.

SUMMARY

Aspects of the disclosure provide a method for power reduction in an electronic device. The method includes determining, by the electronic device, a local timer value corresponding to an idle time for the electronic device to stay in an idle mode before entering a power saving mode. The electronic device is registered to a service provider to provide service to the electronic device. Further, the method includes starting, upon entering the idle mode, a specific timer with the local timer value, and another timer to track a next update time for the electronic device to update tracking area to the service provider for maintaining the electronic device to be registered to the service provider, exiting the idle mode and entering the power saving mode when the specific timer expires, exiting the power saving mode when the other timer expires, and updating the tracking area to the service provider to keep the electronic device being registered to the service provider.

To determine, by the electronic device, the local timer value corresponding to the idle time for the electronic device to stay in the idle mode before entering the power saving mode, the method includes determining an availability of a timer value provided by the service provider for the electronic device to stay in the idle mode, and determining, by the electronic device, the local timer value when the timer value is not available.

To determine the availability of the timer value provided by the service provider for the electronic device to stay in the idle mode, the method includes transmitting a request to the service provider to request an activation of the power saving mode from the service provider, and determining whether the timer value exists in a response from the service provider.

In an example, the method includes transmitting an attach request that includes a proposed timer value corresponding to a proposed idle time for the electronic device to stay in the idle mode, and determining whether an attach accept message includes the timer value provided by the service provider. In another example, the method includes transmitting a tracking area update that includes a proposed timer value corresponding to a proposed idle time for the electronic device to stay in the idle mode, and determining whether a tracking area update accept message includes the timer value provided by the service provider.

In an example, the method includes shutting down at least one of paging reception, measurement, and cell selection operations in the power saving mode.

In an embodiment, the method includes determining the local timer value corresponding to the idle timer based on attributes of the electronic device.

Aspects of the disclosure provide an apparatus that includes a transceiver circuit and a baseband processing circuit. The transceiver circuit is configured to receive and transmit wireless signals that register the apparatus to a service provider. The baseband processing circuit is configured to determine a local timer value corresponding to an idle time for the apparatus to stay in an idle mode before entering a power saving mode, start, upon the apparatus entering the idle mode, a specific timer with the local timer value, and another timer to track a next update time for the electronic device to update tracking area to the service provider for maintaining the apparatus to be registered to the service provider, control the apparatus to exit the idle mode and enter the power saving mode when the specific timer expires, control the apparatus to exit the power saving mode when the other tinier expires and generate a tracking area update message for the transceiver circuit to transmit to the service provider to keep the apparatus being registered to the service provider.

Aspects of the disclosure provide a non-transitory computer readable medium storing program instructions for causing a processor to execute operations for power reduction in an electronic device. The operations include determining a local timer value corresponding to an idle time for the electronic device to stay in an idle mode before entering a power saving mode. The electronic device is registered to a service provider to provide service to the electronic device. The operations further include starting, upon entering the idle mode, a specific timer with the local timer value, and another timer to track a next update time for the electronic device to update tracking area to the service provider for maintaining the electronic device to be registered to the service provider, controlling the electronic device to exit the idle mode and enter the power saving mode when the specific timer expires, controlling the electronic device to exit the power saving mode when the other timer expires, and updating the tracking area to the service provider to keep the electronic device being registered to the service provider.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
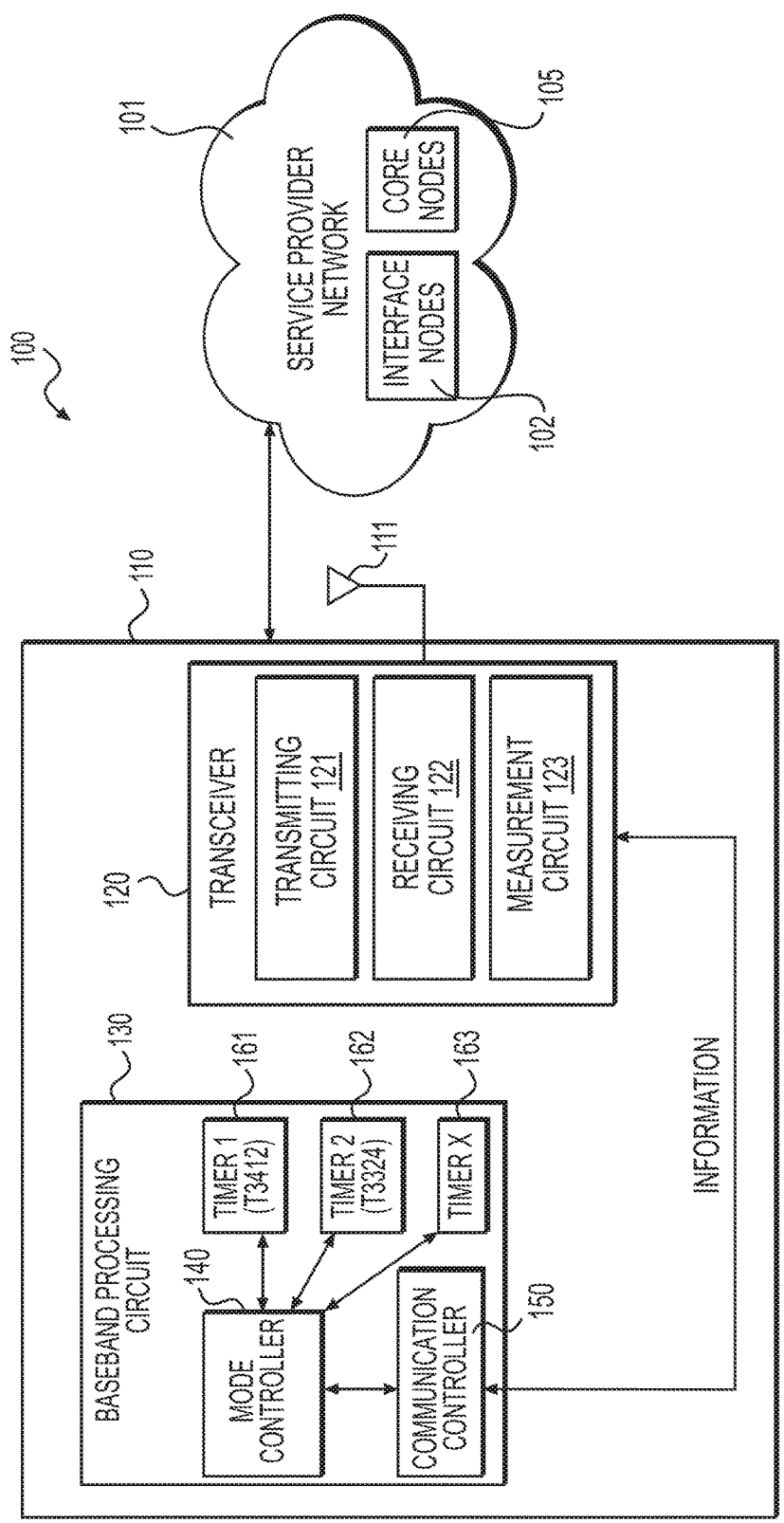
FIG. 1 shows a diagram of a communication system 100 according to an embodiment of the disclosure.

FIG. 1 shows a diagram of a communication system 100 according to an embodiment of the disclosure. The communication system 100 includes an electronic device 110 that has established a connection with a service provider network 101. The electronic device 110 has a power saving mode, and generally relies on timing information provided from the service provider network 101 to enter/exit the power saving mode without losing the connection with the service provider network 101. According to the disclosure, when the timing information from the service provider network 101 is not available, the electronic device 100 is configured to locally determine timing information that can be used to enter/exit the power saving mode without losing the connection with the service provider network 101, and then to use the timing information to enter/exit the power saving mode to save power.

The service provider network 101 can be any suitable service provider network, such as mobile service provider network, wireless communication service provider, and the like. In an embodiment, the service provider network 101 is a mobile service provider network 101 that can be implemented using any suitable wireless communication technology, such as third generation (3G) mobile network technology, fourth generation (4G) mobile network technology, fifth generation (5G) mobile network technology, global system for mobile communication (GSM), long-term evolution (LTE), and the like. The service provider network 101 includes a plurality of nodes, such as interface nodes 102, core nodes 105, and the like that are coupled together by any suitable network technology, such as wired, wireless, fiber optical network, and the like.

In an example, the interface nodes 102, such as base transceiver stations, Node Bs, evolved Node Bs, and the like, include hardware components and software components configured to enable wireless communications between the interface nodes and electronic devices, such as the electronic device 110, and the like that has subscribed services provided by the service provider network 101. Further, in the example, the core nodes 105 include hardware components and software components to form a backbone to manage and control the services provided by the service provider network 101.

The electronic device 110 can be any suitable electronic device. In an example, the electronic device 110 is a terminal device used by an end-user (user equipment) for mobile telecommunication, such as a cell phone, a smart phone, a tablet computer, and the like. In another example, the electronic device 110 is a machine type communication device, such as a wireless sensor, and the like.

According to an aspect of the disclosure, the electronic device 110 is configured to perform suitable procedure to register to the service provider network 101. When the electronic device 110 is registered to the service provider network 101, the service provider network 101 allocates resources, such as memory resource, timer resource, frequency resource, channel resource, and the like for communication with the electronic device 110. The electronic device 110 can communicate with the service provider network 101 using the allocated resources. When the electronic device 110 loses the registered status with the service provider network 101, the electronic device 110 need to perform the suitable procedure again to be registered with the service provider network 101.

According to an aspect of the disclosure, the electronic device 110 is a battery-powered device. The electronic device 110 is configured to have a plurality of operation modes, such as a normal mode, an idle mode, a power saving mode (PSM), and the like that have different levels of power consumption. For example, the power saving mode has the least power consumption among the operation modes. The electronic device 110 is configured to increase opportunities to enter the power saving mode to save power, and increase battery life.

In an embodiment, the power saving mode relies on information provided by the service provider network 101 to keep the electronic device 110 to be registered in the power saving mode. When the information provided by the service provider network 101 is not available, the electronic device 110 is configured to determine locally the information that can keep the electronic device 110 to be registered in the power saving mode, and use the information to enter/exit the power saving mode.

Specifically, in the FIG. 1 example, the electronic device 110 includes a transceiver circuit 120 and a baseband processing circuit 130 coupled together as shown in FIG. 1. In the example, the transceiver circuit 120 is coupled to an antenna 111, and includes a transmitting circuit 121, a receiving circuit 122, and a measurement circuit 123.

The transceiver circuit 120 is configured to receive and transmit wireless signals. For example, the receiving circuit 122 is configured to generate electrical signals in response to captured electromagnetic waves by the antenna 111, process the electrical signals to extract digital streams from the electrical signals. In an example, the transmitting circuit 121 is configured to receive digital streams, such as management frames, data frames, and the like from for example the baseband processing circuit 130, generate radio frequency (RF) signals to carry the digital streams, and emit electromagnetic waves in the air via the antenna 111 to transmit wireless signals that carry the digital streams. The measurement circuit 123 is configured to perform measurements, such as received signal strength measurement, and the like.

The baseband processing circuit 130 is configured to perform various processing in baseband. The baseband processing circuit 130 can be implemented using any suitable technology. In an embodiment, the baseband processing circuit 130 is implemented using pure circuits. In another embodiment, the baseband processing circuit 150 is implemented using a processor (not shown) and memory circuit (not shown). The memory circuit is configured to store data and software instructions. The processor is configured to execute software instructions to process data.

According to an aspect of the disclosure, the electronic device 110 can be configured to have multiple operation modes of different power consumption. For example, when the electronic device 110 is configured in the normal mode, the transmitting circuit 121, the receiving circuit 122, the measurement circuit 123 and the baseband processing circuit 130 are actively in operation, thus the electronic device 110 consumes a relatively large amount of power.

When the electronic device 110 is in the idle mode, the transmitting circuit 121 is powered off in an example to reduce power consumption. In the idle mode, the electronic device 110 still performs certain operations, such as paging reception operation, measurement operation, cell re-selection operation, and the like. For example, the receiving circuit 122 is still active and receives and processes for example paging signals; the measurement circuit 123 is still active and measures for example received signal strength; and the baseband processing circuit 130 is active and performs, for example, cell reselection operations based on the received paging signals and the measurements of the received signal strength.

When the electronic device 110 is in the power saving mode, the certain operations, such as paging reception operation, measurement operation, cell re-selection operation, are shut off to save more power. For example, in the power saving mode, the transmitting circuit 121, the receiving circuit 122 and the measurement circuit 123 are powered off. In addition, in an example, the baseband processing circuit 130 can be configured to reduce power consumption. For example, a portion of the baseband processing circuit 130 can be powered off In the FIG. 1 example, the baseband processing circuit 130 includes a mode controller 140, a plurality of timers 161-163, and a communication controller 150 coupled together as shown in FIG. 1. The baseband processing circuit 130 can include other suitable components (not shown).

The communication controller 150 is configured to manage communication with the service provider network 101. In an embodiment, the communication controller 150 is configured to manage communication according to a telecommunication technical standard, such as standards developed by the 3rd generation partnership project (3GPP) unites telecommunications standard development organizations. For example, the communication controller 150 is configured to have an access stratum (AS) functional layer that is responsible for carrying information between the electronic device 110 and the service provider network 101 (e.g., the interface nodes 102) using wireless signals, and have a non-access stratum (NAS) functional layer that is responsible for managing the establishment of communication and for maintaining continuous communications between the electronic device 110 and the service provider network 101 (e.g., core nodes 105).

The communication controller 150 can provide information to the transceiver circuit 120 and can receive information from the transceiver circuit 120. The transceiver circuit 120 can be configured according to the operations of the communication controller 150. For example, when the communication controller 150 is configured to stop transmitting operations (uplink) of the AS functional layer operations in the idle mode, the transmitting circuit 121 can be powered off When the communication controller 150 is configured to stop receiving operations (downlink) of the AS functional layer operations in the power saving mode, the receiving circuit 122 and the measurement circuit 123 can be powered off In an example, the communication controller 150 explicitly provides control signals to power up/down the respective circuits in the transceiver circuit 120. In another example, the communication controller 150 provides information that is indicative of power controls to the respective circuits in the transceiver circuit 120, and accordingly the transceiver circuit 120 can generate control signals to power up/down the respective circuits in the transceiver circuit 120.

The mode controller 140 is configured to control the timers 161-163, and provide information to the communication controller 150 according to operations of the timers 161-163. For example, the mode controller 140 can set a timer value to a timer, and start the timer; when the timer expires, the mode controller 140 adjusts operation mode accordingly.

The timers 161-163 are configured to keep track of time. In an embodiment, the timers 161-163 are implemented in hardware, such as using circuits. In an example, a timer is implemented using a counter circuit. For example, when a value is set to the timer, the counter circuit is initiated with the value; when the tinier is started, the counter circuit counts down according to a clock signal at a steady pace; and when the counter circuit reaches zero, the tinier expires.

In the FIG. 1 example, the timer 161 (T3412 timer) is configured to track time for periodic tracking area update, the tinier 162 (T3324 timer) is configured to track time for the idle time, and the timer 163 is configured to track time for locally determined idle time.

In an example, when the electronic device 110 registers with the service provider network 101 and establishes a communication with the service provider network 101, the electronic device 110 performs periodic tracking area update to keep the registered status with the service provider network 101. The period for tracking area update is referred as periodic tracking area update period. The tracking area update allows the electronic device 110 to periodically notify the availability of the electronic device 110 to the service provider network 101 for the service provider network 101 to maintain the electronic device 110 to be registered. For example, in the LTE technology, the service provider network 101 locates the electronic device 110 in the units of tracking areas for the purpose of paging. A tracking area includes a single cell or a plurality of cells. The electronic device 110 periodically notifies the tracking area where the electronic device 110 is located. The service provider network 101 maintains NAS connection over a reachable time that is based on the tracking area update period. In an example, the core nodes 105 allocates a reachable timer (not shown) corresponding to the electronic device 110. The reachable tinier is set with a reachable time that is longer than the periodic tracking area update period, such as a sum of the periodic tracking area update period and four additional minutes, and keeps track of time for next tracking area update. When the reachable tinier expires, and the service provider network 101 does not receive tracking area update from the electronic device 110, the electronic device 110 may lose the NAS connection, and may need to perform a communication establishment procedure again with the service provider network 101 to register to the service provider network 101 again in order to receive the service provided by the service provider network 101.

In the FIG. 1 example, the timer 161 in the electronic device 110 tracks the time for a next periodic tracking area update. In an example, when the timer 161 expires, the mode controller 140 controls the electronic device 110 to enter the normal mode, the communication controller 150 then provides tracking area update information, and the transceiver circuit 120 transmits wireless signals carrying the tracking area update information. The interface nodes 102 receive the tracking area update information in wireless signals, and the core nodes 105 process the tracking area update information. Thus, the electronic device 110 keeps the NAS connection with the service provider network 110.

In the FIG. 1 example, the timer 162 in the electronic device 110 tracks the time that the electronic device 110 is in the idle mode. In an example, when the timer 162 expires, the mode controller 140 controls the electronic device 110 to exit the idle mode, and to enter the power saving mode to save power.

In an example, the service provider network 101 supports the power saving mode, and provide suitable timer values to allow the electronic device 110 to have more opportunities to stay in the power saving mode. For example, during operation, when the mode controller 140 determines to change to power saving mode, the communication controller 150 includes a first timer value that is proposed for the timer 162 in a message, such as an attach request, a tracking area update request, and the like to indicate a request to activate the power saving mode from the service provider network 101. It is noted that, in an example, the communication controller 150 can include a second timer value that is proposed for the timer 161 in the message. In an example, the second timer value is the periodic tracking area update period.

Then, the transceiver circuit 120 transmits wireless signals carrying the message. The service provider network 101 receives the message, and identifies the request to activate the power saving mode. When the service provider network 101 accepts the request to activate the power saving mode, the service provider network 101 provides a third timer value that is determined for the timer 162 in a response message, such as an attach accept message, a tracking area update accept message, and the like. It is noted that, in an example, the service provider network 101 provides a fourth timer value that is determined for the timer 161 in the response message.

In an example, the service provider network 101 sets the reachable timer corresponding to the electronic device 110 according to the fourth timer value, such as four minutes in addition to the fourth timer value, and starts the reachable timer.

It is noted that the third timer value can be the same as the first timer value or can be different from the first timer value, and the fourth timer value can be the same as the second timer value or can be different from the second timer value.

In an example, when the electronic device 110 receives the response message from the service provider network 101, the electronic device 110 extracts the timer values in the response message, and sets timers according to the timer values in the response message. In an example, the mode controller 140 sets the timer 162 to have the third timer value, sets the timer 161 to have the fourth timer value, starts the timer 161 and the timer 162, and controls the electronic device 110 to enter the idle mode. When the timer 162 expires, the mode controller 140 controls the electronic device 110 to enter the power saving mode; and when the timer 161 expires, the mode controller 140 controls the electronic device 110 to exit the power saving mode and enter the normal mode. Then, the communication controller 150 prepares tracking area update message, and the transceiver circuit 120 transmits wireless signals to carry the tracking area update message.

According to an aspect of the disclosure, the electronic device 110 is not able to receive the timer values provided by the service provider network 101. In an example, the service provider network 101 does not support the power saving mode, and does not include the third timer value in the response message.

According to the disclosure, when the electronic device 110 does not receive the third timer value, the mode controller 140 can determine a local timer value, and set a timer, such as the timer 163 according to the local timer value. In an embodiment, the mode controller 140 determines the local timer value based on attributes of the electronic device 110, such as applications that are running in the electronic device 110, battery remaining level, and the like. In an example, the local timer value is zero to aggressively save power. Generally, the local timer value is smaller than the periodic tracking area update period, which is the second timer value for the timer 161.

Then, the mode controller 140 sets the timer 161 to have the second timer value, sets the timer 163 to have the local timer value, starts the timer 161 and the timer 163, and controls the electronic device 110 to enter the idle mode. When the timer 163 expires, the mode controller 140 controls the electronic device 110 to exit the idle mode and enter the power saving mode; and when the timer 161 expires, the mode controller 140 controls the electronic device 110 to exit the power saving mode and enter the normal mode. Then, the communication controller 150 prepares tracking area update message, and the transceiver circuit 120 transmits wireless signals to carry the tracking area update message to the service provider network 101.

It is noted that the electronic device 110 can exit the power saving mode due to other triggers, such as a need to send data generated in the electronic device 110.

Figure 2:
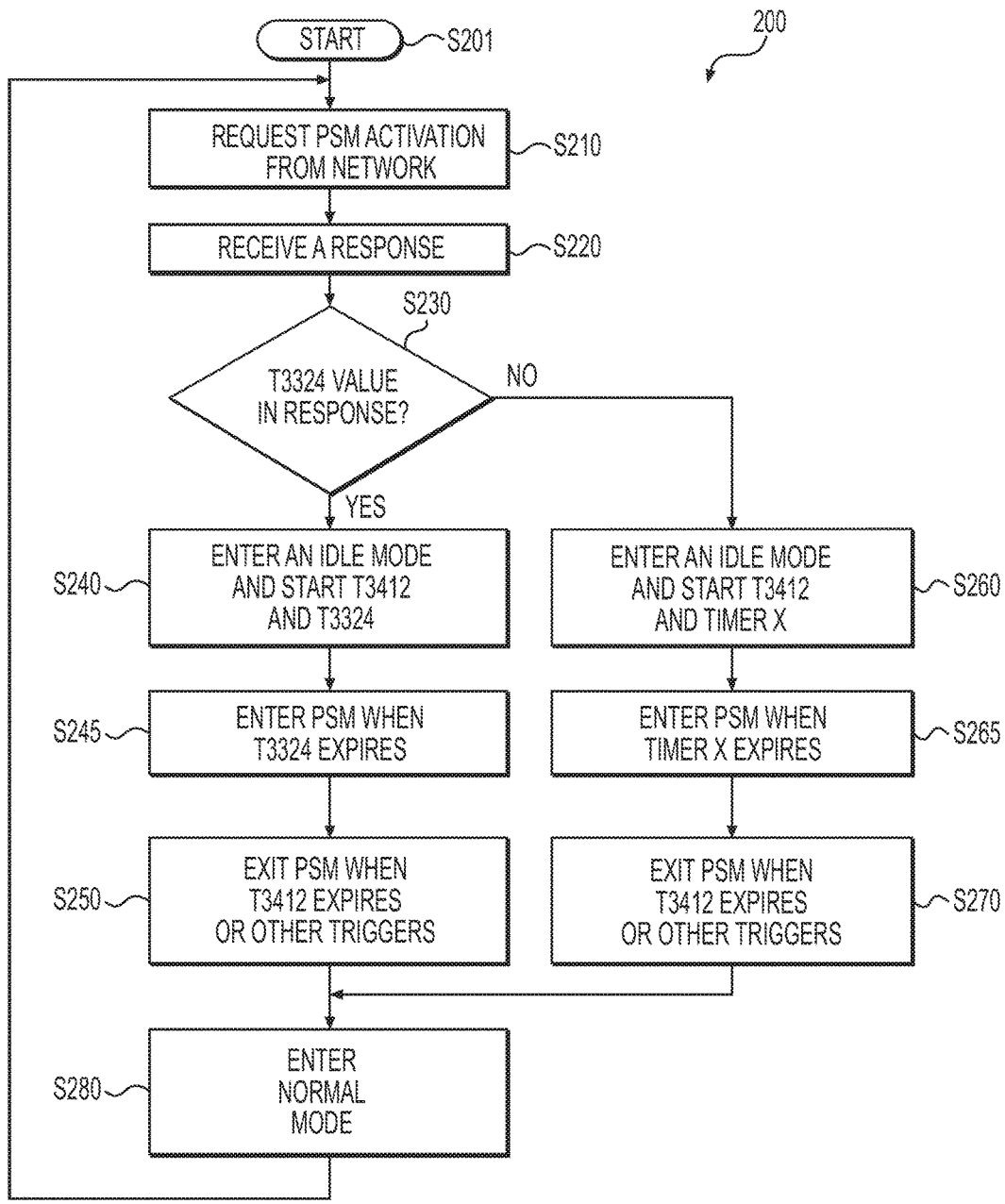
FIG. 2 shows a flow chart outlining a process 100 according to an embodiment of the disclosure.

FIG. 2 shows a flow chart outlining a process example 200 according to an embodiment of the disclosure. In an example, the process is executed by the electronic device 110 in FIG. 1. The process starts at S201 and proceeds to S210.

At S210, a request to activate a power saving mode from a service provider network is transmitted. In the FIG. 1 example, the mode controller 140 determines a chance to enter the power saving mode, the communication controller 150 generates a message, such as an attach request, a tracking area update request, and the like to include a first timer value that is proposed for the T3324 timer (the timer 162) to indicate a request to activate the power saving mode. In an example, the message includes a second timer value that is proposed for the T3412 timer (the timer 161). Then, the transceiver circuit 120 transmits wireless signals carrying the message.

At S220, a response message is received. In the FIG. 1 example, the service provider network 101 sends an attach accept message in response to the attach request, or sends a tracking area update accept message in response to the tracking area update request. When the service provider network 101 supports the power saving mode operation and accepts the power saving mode, the service provider network 101 provides a third timer value that is determined for the T3324 timer in the response message. In an example, the response message also includes a fourth timer value that is determined for the T3412 timer. However, when the service provider network 101 does not support the power saving mode operation, the third timer value for the timer T3324 is not in the response message.

At S230, the electronic device 110 detects whether the third timer value for the T3324 timer is in the response message. When the third timer value for the T3324 is in the response message, the process proceeds to S240; otherwise the process proceeds to S260.

At S240, the electronic device 110 enters the idle mode. Further, the mode controller 140 sets the third value to the T3324 timer, sets the fourth value to the T3412 timer, and starts the T3412 timer and the T3324 timer.

At S245, when the timer T3324 expires, the electronic device 110 exits the idle mode and enters the power saving mode.

At S250, when the timer T3412 expires, the electronic device 110 exits the power saving mode. Other suitable triggers can also cause the electronic device 110 to exit the power saving mode.

At S260, the electronic device 110 enters the idle mode. Further, the mode controller 140 determines a local timer value for the Timer X (the timer 163), sets the Timer X with the local timer value, sets the T3412 timer with the periodic tracking area update period, and starts the T3412 timer and the Timer X.

At S265, when the Timer X expires, the electronic device 110 exits the idle mode and enters the power saving mode.

At S270, when the timer T3412 expires, the electronic device 110 exits the power saving mode. Other suitable triggers can also cause the electronic device 110 to exit the power saving mode.

At S280, the electronic device 110 enters the normal mode. In the normal mode, the transceiver 120 is powered up and transmits/receives wireless signals that carry various information. When the electronic device 110 finds a change to enter the power saving mode, the process returns to S210.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for power reduction in an electronic device, comprising:
   determining, by the electronic device, a local timer value corresponding to an idle time for the electronic device to stay in an idle mode before entering a power saving mode, the electronic device being registered to a service provider to provide service to the electronic device;
   starting, upon entering the idle mode, a specific timer with the local timer value, and another timer to track a next update time for the electronic device to update tracking area to the service provider for maintaining the electronic device to be registered to the service provider;
   exiting the idle mode and entering the power saving mode when the specific timer expires;
   exiting the power saving mode when the other timer expires; and
   updating the tracking area to the service provider to keep the electronic device being registered to the service provider.

2. The method of claim 1, wherein determining, by the electronic device, the local timer value corresponding to the idle time for the electronic device to stay in the idle mode before entering the power saving mode further comprises:
   determining an availability of a timer value provided by the service provider for the electronic device to stay in the idle mode; and
   determining, by the electronic device, the local timer value when the timer value is not available.

3. The method of claim 2, wherein determining the availability of the timer value provided by the service provider for the electronic device to stay in the idle mode further comprises:
   transmitting a request to the service provider to request an activation of the power saving mode from the service provider; and
   determining whether the timer value exists in a response from the service provider.

4. The method of claim 2, wherein determining the availability of the timer value provided by the service provider for the electronic device to stay in the idle mode further comprises:
   transmitting an attach request that includes a proposed timer value corresponding to a proposed idle time for the electronic device to stay in the idle mode; and
   determining whether an attach accept message includes the timer value provided by the service provider.

5. The method of claim 2, wherein determining the availability of the timer value provided by the service provider for the electronic device to stay in the idle mode further comprises:
   transmitting a tracking area update that includes a proposed timer value corresponding to a proposed idle time for the electronic device to stay in the idle mode: and
   determining whether a tracking area update accept message includes the timer value provided by the service provider.

6. The method of claim 1, wherein exiting the idle mode and entering the power saving mode when the specific timer expires comprises:
   shutting down at least one of paging reception, measurement, and cell selection operations in the power saving mode.

7. The method of claim 1, wherein starting, upon entering the idle mode, the specific timer with the local timer value, and the other timer to track the next update time for the electronic device to update tracking area to the service provider for maintaining the electronic device to be registered to the service provider further comprises:
   starting the other timer according to a periodic tracking area update period.

8. The method of claim 1, wherein determining, by the electronic device, the local timer value corresponding to the idle time for the electronic device to stay in the idle mode before entering the power saving mode further comprises:
   determining the local timer value corresponding to the idle timer based on attributes of the electronic device.

9. An apparatus, comprising:
   transceiver circuit configured to receive and transmit wireless signals that register the apparatus to a service provider; and
   baseband processing circuit configured to:
      determine a local timer value corresponding to an idle time for the apparatus to stay in an idle mode before entering a power saving mode;
      start, upon the apparatus entering the idle mode, a specific timer with the local timer value, and another timer to track a next update time for the apparatus to update tracking area to the service provider for maintaining the apparatus to be registered to the service provider;
      control the apparatus to exit the idle mode and enter the power saving mode when the specific timer expires;
      control the apparatus to exit the power saving mode when the other timer expires; and
      generate a tracking area update message for the transceiver circuit to transmit to the service provider to keep the apparatus being registered to the service provider.

10. The apparatus of claim 9, wherein baseband processing circuit is configured to:
    determine an availability of a timer value provided by the service provider for the apparatus to stay in the idle mode; and
    determine the local timer value when the timer value is not available.

11. The apparatus of claim 10, wherein:
    the transceiver circuit is configured to transmit a request to the service provider to request an activation of the power saving mode from the service provider and receive a response; and the baseband processing circuit is configured to determine whether the timer value exists in the response from the service provider.

12. The apparatus of claim 10, wherein:
the transceiver circuit is configured to transmit an attach request that includes a proposed timer value corresponding to a proposed idle time for the apparatus to stay in the idle mode; and
the baseband processing circuit is configured to determine whether an attach accept message includes the timer value provided by the service provider.

13. The apparatus of claim 10, wherein:
the transceiver circuit is configured to transmit a tracking area update that includes a proposed timer value corresponding to a proposed idle time for the apparatus to stay in the idle mode; and
the baseband processing circuit is configured to determine whether a tracking area update accept message includes the timer value provided by the service provider.

14. The apparatus of claim 9, wherein the baseband processing circuit is configured to:
shut down at least one of paging reception, measurement, and cell selection operations in the power saving mode.

15. The apparatus of claim 9, wherein the baseband processing circuit is configured to
start the other timer according to a periodic tracking area update period.

16. The apparatus of claim 9, wherein the baseband processing circuit is configured to
determine the local timer value corresponding to the idle timer based on attributes of the apparatus.

17. A non-transitory computer readable medium storing program instructions for causing a processor to execute operations for power reduction in an electronic device, the operations comprising:
determining a local timer value corresponding to an idle time for the electronic device to stay in an idle mode before entering a power saving mode, the electronic device being registered to a service provider to provide service to the electronic device;
starting, upon entering the idle mode, a specific timer with the local timer value, and another timer to track a next update time for the electronic device to update tracking area to the service provider for maintaining the electronic device to be registered to the service provider;
controlling the electronic device to exit the idle mode and enter the power saving mode when the specific timer expires;
controlling the electronic device to exit the power saving mode when the other timer expires; and
updating the tracking area to the service provider to keep the electronic device being registered to the service provider.

18. The non-transitory computer readable medium of claim 16, wherein the operation of determining, by the electronic device, the local timer value corresponding to the idle time for the electronic device to stay in the idle mode before entering the power saving mode further comprises:
determining an availability of a timer value provided by the service provider for the electronic device to stay in the idle mode; and
determining, by the electronic device, the local timer value when the timer value is not available.

19. The non-transitory computer readable medium of claim 18, wherein the operation of determining the availability of the timer value provided by the service provider for the electronic device to stay in the idle mode further comprises:
controlling a transceiver circuit to transmit a request to the service provider to request an activation of the power saving mode from the service provider and receive a response from the service provider; and
determining whether the timer value exists in the response from the service provider.

20. The non-transitory computer readable medium of claim 18, wherein the operations comprise:
shutting down at least one of paging reception, measurement, and cell selection operations in the power saving mode.

* * * * *

UNITED STATES PATENT AND TRADEMARK OFFICE
CERTIFICATE OF CORRECTION

PATENT NO. : 9,699,728 B2  
APPLICATION NO. : 15/277634  
DATED : July 4, 2017  
INVENTOR(S) : Jarkko Eskelinen Page 1 of 1

It is certified that error appears in the above-identified patent and that said Letters Patent is hereby corrected as shown below:

On the Title Page

Item (60), the Related U.S. Application Data has been omitted. Item (60) should read:
-- Related U.S. Application Priority Data
(60) Provisional application No. 62/234,863, filed on Sep. 30, 2015. --

Signed and Sealed this
Tenth Day of April, 2018

Andrei Iancu
*Director of the United States Patent and Trademark Office*